Patented Sept. 13, 1932

1,876,768

UNITED STATES PATENT OFFICE

WILLIAM SELTZER, OF PASSAIC, NEW JERSEY

METHOD OF TREATING SULPHONATED OILS, ETC.

No Drawing.  Application filed October 4, 1929. Serial No. 397,441.

This invention relates to the manufacture of sulphonated oils, fats and fatty acids and it has for its principal object by an economical procedure to treat a sulphonated oil, fat or fatty acid so that the undesirable fraction shall be reduced to a far less proportion than has heretofore been possible by any known or at least commercially practicable method, if not substantially completely eliminated. Such undesirable fraction, as is known, comprises free fatty acids, neutral (unacted-on) oil or fat, and in some cases alkali salts of fatty acids.

The sulphonated oil, fat or fatty acid of commerce heretofore known contained an appreciable portion of the said undesirable fraction and in the effort to reduce it the problem has been usually approached with the idea that the sulphonation must be accomplished by the chemical combination of as much of the sulphonating agent with the oil, etc., as possible. If there was any step or expedient employed beside the sulphonating step itself and the usual and final neutralizing as with ammonia, soda or potash, it was usually only a "washing" of the already sulphonated material to rid it of the excess of the sulphonating agent by mixing it with a suitable liquid, as water or a neutral salt or alkalin solution, allowing the mixture to stand and settle, and drawing off the sub-stratum resulting and which of course contained the excess of the sulphonating agent, the thus-washed oil forming the superstratum.

I have discovered that I can purge the sulphonated material of the said undesirable fraction very appreciably, if not completely, by a method which is at once simpler and more economical then any heretofore practiced and the product of which possesses certain desirable characteristics and valuable properties not present, or present only to a limited extent, in the sulphonated oils and fats obtained by previous methods; thus the product of my method will have a high content of sulpho-fatty acids (or alkali salts of sulpho-fatty acids), a low content of what I have termed the undesired fraction, a resistance to acids, calcium and magnesium salts and sodium chloride, and the ability to form stable solutions or suspensions in the presence of these salts.

According to my invention as I preferably practice it the oil, fat or fatty acid after subjection to a sulphonating treatment, is mixed in the presence of water with some untreated oil substance ordinarily substantially non-volatile (the term "untreated" herein meaning unsulphonated, that is to say, water-insoluble, and the oil substance being meant to include not only an oil, fat or fatty acid the same as that being sulphonated but any fixed vegetable, animal or mineral oil, fat or fatty acid or wax that is ordinarily substantially non-volatile), whereupon the mixture is allowed to stand, with consequent separation of that portion of the whole liquid content which is water-insoluble from the remaining portion thereof, the latter assuming by settling the subjacent relation on such separation. In this procedure and on the separation being allowed to take place in this way, while the water acts to dissolve all water-soluble substances that are present and so these fall in dissolved state to form the lower stratum, the oil substance seems to have an affinity for and to carry to the upper stratum all vagrant water-insoluble particles, for when the lower stratum has been carefully drawn off so that none of the upper stratum is withdrawn with it the former is found to be sulpho-fatty acid in water solution, practically completely purged of all matter constituting the undesirable fraction.

It is preferable (though not indispensable) to subject the oil, etc., to the sulphonating treatment first and then wash it before effecting the mixing with the fixed oil substance. Of course in such case the oil, fat or fatty acid left in the vessel after the settling and separation incident to this washing treatment is the portion of the original mixture which according to my invention, is to be mixed with the oil substance and water.

When the mixing with the oil substance and water has been done and the settling and separating are effected the subjacent portion of the liquid drawn off this may be neutralized in any way, as hereinbefore indicated is usually practiced; and, if desired, it may be also concentrated by a suitable acid or salt solution, i. e., to remove water present therein.

As for the mentioned superincumbent water-insoluble portion which results from the sulphonating, mixing and settling, on separating therefrom any vagrant water therein, as by heating, the remainder is itself treated in accordance with this invention.

By way of example, only, I mention the following procedure by which my invention may be performed:

To 1500 lbs. of castor oil, already subjected to a sulphonating treatment and also preferably washed as I have indicated, add 725 lbs. of neutral (untreated or unsulphonated) castor oil and 1125 lbs. of water. Mix thoroughly and allow the mixture to stand and so settle. After 4–6 hours a distinct separation will take place. Draw off the lower stratum into a 25% salt solution (sodium chloride or sulphate being preferable). After 2–4 hours an oil layer will form over the salt solution. Draw off the salt solution and neutralize the oil layer remaining.

The upper stratum of the original mixture may thereupon be treated in the same way.

I am aware that it has been known in the course of analytical procedure to purge an oil, fat or fatty acid subjected to a sulphonating treatment of the undesirable fraction by mixing the same with a volatile substance (ether) and water. Such a treatment is not only so expensive as to be commercially impracticable but this volatile substance, being a solvent of oils, etc., undesirably affects both layers resulting on the settling, giving the lower layer (which is to constitute the product) an undesirable odor and making it impossible to re-use the upper layer unless an expensive step to remove this substance is in each case resorted to.

My invention, being based on the discovery that when an untreated oil substance is used the product will be purged of substantially all undesirable matter, is characterized in its procedure by absence of all these faults.

Of course the separation I have referred to in connection with my procedure may be effected by taking advantage of the difference in specific gravity of the water-soluble and water-insoluble portions of the mixture, as by resort to a centrifuge.

Having thus fully described my invention what I claim is:

1. The hereindescribed method of purging a sulphonated oil, fat or fatty acid of the undesirable fraction which consists in mixing such oil, fat or fatty acid in the presence of water with an untreated oil substance ordinarily substantially non-volatile and allowing the water-soluble and water-insoluble portions of the entire content to separate into two distinct bodies.

2. The hereindescribed method of purging a sulphonated oil, fat or fatty acid of the undesirable fraction which consists in mixing such oil, fat or fatty acid in the presence of water with an oil substance which is less miscible with water than the water-soluble portion of the oil, fat or fatty acid and allowing the water-soluble and water-insoluble portions of the entire content to separate into two distinct bodies.

3. The hereindescribed method of purging a sulphonated oil, fat or fatty acid of the undesirable fraction which consists in mixing such oil, fat or fatty acid in the presence of water with an untreated oil substance ordinarily substantially nonvolatile, allowing the water-soluble and water-insoluble portions of the entire content to separate into two distinct bodies, and removing one such body from the other.

In testimony whereof I affix my signature.

WILLIAM SELTZER.